IRVING R. BRENHOLDT
INVENTOR.

BY S. A. Giarratana
Francis L. Masselle
ATTORNEYS

Jan. 10, 1967  I. R. BRENHOLDT  3,297,877
CAPACITIVE COUPLING FOR A PHOTOCATHODE
IN A POSITION INDICATING DEVICE
Filed Nov. 27, 1963  2 Sheets-Sheet 2

IRVING R. BRENHOLDT
INVENTOR.

BY S. A. Gianatana
Francis L. Masselle
ATTORNEYS

United States Patent Office 3,297,877
Patented Jan. 10, 1967

3,297,877
CAPACITIVE COUPLING FOR A PHOTOCATHODE IN A POSITION INDICATING DEVICE
Irving R. Brenholdt, Montclair, N.J., assignor to General Precision Inc., Little Falls, N.J., a corporation of Delaware
Filed Nov. 27, 1963, Ser. No. 326,516
10 Claims. (Cl. 250—211)

This invention relates generally to a photoelectric position indicating device and more particularly to a device utilizing the principle of capacitive polarization of a photocathode to provide an indication of the position of an area of contrast on the photocathode surface.

The indication of the position of an object in space can be accomplished by a variety of methods. These methods generally rely on the utilization of photoelectric devices which are adapted for use in either a mechanical or electrical system. For instance, once an image of the object hase been provided, mechanical means can be used to detect the optical image and thus procure an indication of the position. However, indicating systems of this general image type are not limited to mechanical means only. An electronic image can be provided of an object and the position of this image can be detected to measure the position of the object. More recently, electronic position indicating has increased in importance, and devices which reflect an electron scanning beam to thereby provide an indication of the position of an object are not uncommon.

Many of the prior art devices are either too slow in operation, or too large and bulky to be utilized successfully at other than ground stations. In an era characterized by missiles and aircraft that can travel faster than twice the speed of sound, there has been developed a need for an object tracking device, which is capable of being compact in size and can provide a visual indication in a minimum of time. It is also essential that the object tracking device be capable of providing extremely accurate results.

Because position indicators which operate on an optical image principle require a number of lenses and mirrors, or the like, recent emphasis has been placed on devices utilizing a photoelectric principle. For example, a position indicator which detects the position of a bright spot on the photocathode surface of a photoemissive cell can be used as a star tracker. In aircraft tracking during daytime the position of a dark spot on a light background can be determined when using such a photocathode position indicator. Apparatus utilizing photocathodes can also determine the "center of density" of an image. It is in this general area of position indicators using photocathodes that the instant invention applies.

A front surface semiconductive translucent photocathode has an effective resistance across its surface ranging from 1 megohm to 100 megohms, depending upon the surface itself. The resistance varies in accordance with the film material used, its thickness, operating temperature and variations of the like. The photocathode used in the present invention has a high resistance compared to materials which are usually considered conductors.

In the apparatus of the present invention, a plate or metallic deposit is placed on the outer front surface of the photocathode. If one terminal of a time variable source of voltage is connected to this metallic plate or deposit, and a second terminal of the voltage source is connected to the normal outer periphery connection of the photocathode, a fluctuating voltage gradient will be created across the photocathode surface. When such a voltage gradient is produced the photocathode is referred to as being polarized. A capacitance will exist between the metallic plate or deposit and the surface immediately beneath such plate or deposit, with the glass of the photocathode outer surface comprising the dielectric of such capacitance. If the plate does not cover the entire photocathode surface, the portions of the photocathode between the outer edge of the plate and the terminal connection at the outer periphery of the photocathode provides a resistance across which a voltage gradient can be produced. The plate or deposit on the outer surface is divided into a plurality of segments, each insulated one from the other. A voltage variable with time having the same amplitude and frequency is applied to each segment of the plate, but with a phase difference. The phase difference among the segments creates a potential gradient which rotates around the circular photocathode. Because of this rotating potential gradient, an output will be provided which will indicate the position of an area of contrast on the photocathode surface. The output provided in this manner can then be amplified and passed on to an indicating circuit such as a cathode ray tube, or the like, to provide an indication of the position of the area of contrast on the photocathode surface.

Accordingly, a principal object of the present invention is to provide an improved position indicating device.

Another object of this invention is to provide a means indicating the position of an area of contrast on a photocathode surface.

A further object of this invention is the provision of a rotating voltage gradient on the surface of a photocathode to provide an output indicative of the position of an area of contrast on the photocathode surface.

Still another object of this invention is to improve the precision of position indicating devices by providing a polarized photocathode surface to increase such accuracy.

A still further object of this invention is to provide a unique method of determining the position of an area of contrast on the surface of a photocathode.

Still another object of this invention is the provision of a time variable signal upon the surface of a photocathode tube to provide an output indicative of a position of an area of contrast upon the surface of such photocathode.

A still further object of this invention is to provide a means of supplying a rotating voltage gradient upon the surface of a photocathode.

Still another object of this invention is to improve the accuracy of position indicating devices by means of a polarized photocathode.

A still further object of this invention is to reduce the number of components required to indicate the position of an area of contrast on a photocathode.

Still another object of this invention is to provide a new method of photoelectric measuring.

A still further object of this invention is to provide a method for operation of a front surface phototube, utilizing capacitive coupling to the photocathode element from externally placed plates or coatings for the application of sensitizing voltage.

Still another object of this invention is to provide means to sensitize discrete areas of a photocathode with respect to a time reference.

A still further object of this invention is the provision of means to sensitize the total area of a photocathode with respect to a time reference.

Further objects and advantages of the present invention will become readily apparent as the following detailed description of the invention unfolds and when taken in conjunction with the accompanying drawings, wherein.

Figure 1:
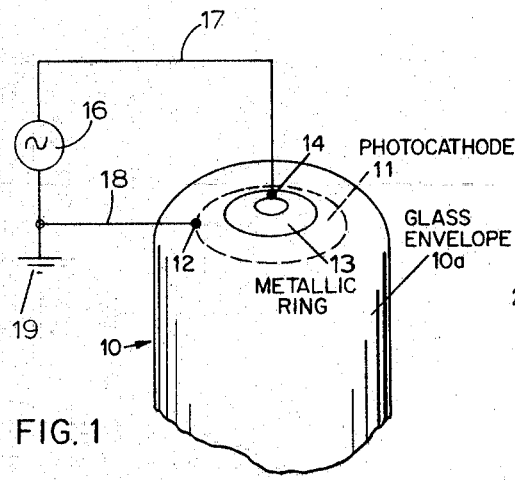
FIG. 1 is a schematic diagram of a photocathode surface with an outer capacitor plate.

Referring now to photoemissive semiconductive electrodes, there is shown in FIG. 1 a circular photocathode 11 of a phototube 10 with a normal terminal connection 12 at its outer periphery. The anode, collector, multiplier or the like of the phototube is not shown. Photocathode 11 is covered by a glass envelope 10a, the latter having a metallic plate or deposit on its outer front surface. In FIG. 1 this metallic plate or deposit is in the form of a ring 13 having a terminal connection 14. Thus it can be seen that there is provided a form of capacitance comprising the metallic plate or deposit forming one plate of a capacitor, the glass of the envelope 10a forming the dielectric, and the area of the photocathode surface directly behind the metallic plate forming the second capacitor plate. The terminal connections 12 and 14 provide a means for applying a voltage across this reactive element. The voltage can be of any time-variable configuration such as a normal alternating voltage, or pulse voltage, or the like.

Figure 2:
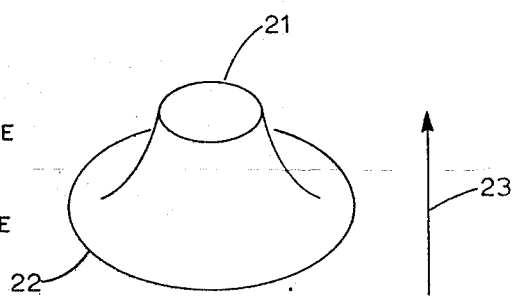
FIG. 2 is a plot of the voltage gradient occurring on the photocathode surface of FIG. 1 when the photocathode is polarized.

In FIG. 1 a normal A.C. source of voltage 16 is shown connected to terminal 14 by means of a line 17. The normal terminal connection 12 of photocathode 11 is connected to the return of voltage source 16 by a line 18 which is shown normally grounded at 19. Upon energization of voltage source 16 there is provided an alternating voltage on the metallic plate 13. This voltage is capacitively induced on the photocathode surface directly behind the plate and is proportional to the ratio of the capacitive reactance involved and the resistance of the remaining area of the photocathode between the plate 13 and the return connection 12 located at the periphery of photocathode 11. The metallic plate in this instance is shown as a ring 13 but can be of any desirable form. With this simple circuit in operation as noted above, there is provided a voltage gradient across the surface of the photocathode 11. The value of the voltage gradient is dependent upon the ratio of the capacitive reactance and the resistance of the photocathode surface as mentioned above. Since the resistance is normally high compared to materials usually considered conductors, the voltage gradient will be of a significant value. Because of this voltage gradient on photocathode 11, the surface of the photocathode can be considered to be polarized. FIG. 2 shows the resulting gradient configuration of the circuit described in FIG. 1, with arrow 23 indicating the direction of increasing relative voltage. From FIG. 2 it can be noted that the relative voltage upon the surface immediately beneath plate 13 (designated by reference numeral 21) is higher than the relative voltage at the periphery of the photocathode 11 (indicated by reference numeral 22). The voltage gradient decreases from its highest value at 21 to its lowest value at the periphery 22 as the area between 21 and 22 is traversed.

Polarization of the photocathode surface with respect to time may be of various forms dependent upon the desired system application. For example, it may be sinusoidal, as described with reference to FIG. 1, or it may be half wave, square wave, pulse, or the like.

Figure 3:
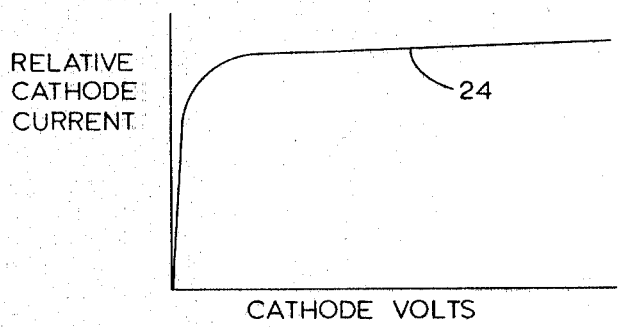
FIG. 3 is a current-voltage curve of a photocathode.

In FIG. 3 there is shown a normal current-voltage curve 24 for a photocathode. The relative cathode current is indicated on the Y axis, and the cathode volts are shown on the X axis. Curve 24 is for a particular value of light intensity. To provide a photoelectric output which is proportional to the polarization voltage, the photocathode must be operated below the knee of curve 24. In other words, A.C. polarization voltage below the knee is necessary to obtain a linear output with regard to the light image position on the photocathode surface. If in some applications a non-linear output versus light image position is desired, the operating range may be extended into the plateau of curve 24 by increasing the A.C. polarization voltage. However most of the operation of the device will be below the knee.

To provide an accurate position indicator using a phototube, it is necessary to determine the position on the photocathode of an area of contrast. Utilizing the principle of capacitive polarization disclosed in the foregoing paragraphs, a means is provided for determining the position of such area of contrast in a homogeneous background. Such means can quite easily provide an indication in a polar coordinate system, and with a slight modification can provide an output indicative of a position in a rectangular coordinate system also.

Figure 4:
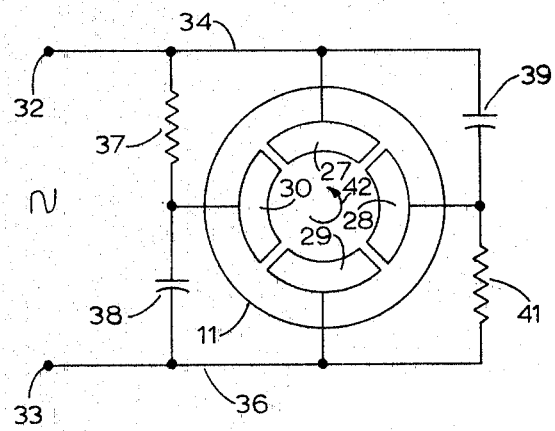
FIG. 4 is a partial schematic of a photocathode showing the arrangement of plates on the photocathode surface.

Referring now to the schematic diagram of FIG. 4, there are provided four metallic plates or conductive deposits 27, 28, 29 and 30 on a phototube envelope near the periphery of the photocathode 11. These plates can be considered as segments insulated from each other of the metallic ring which was discussed above. By means of terminals 32 and 33, a suitable alternating voltage of fixed frequency and amplitude can be applied to each of the plates 27–30. The voltage on each plate differs only in phase, the relationship being such that the phase on each plate differs by 90° in the order of the plate position around the periphery of photocathode 11. In FIG. 4, a pair of resistance-capacitance networks are used to provide the proper phase shift on each of the plates. More specifically, plate 27 is connected to a line 34 which is connected to terminal 32, while plate 29 is connected to line 36 which is in turn connected to terminal 33. Series connected between lines 34 and 36 is a first resistance-capacitance network comprising a resistor 37 and capacitor 38, and a second resistance-capacitance network comprising a capacitor 39 and a resistor 41. Plate 30 is connected to the junction of resistor 37 and capacitor 38, while plate 28 is connected to the junction between resistor 41 and capacitor 39.

Upon the application of an alternating voltage to input terminals 32 and 33 of the circuit, the phase at terminal 32 can be considered to be at a phase angle $\theta$. At the same instant, the voltage at terminal 33 is in the opposite phase, or $-\theta$. Thus the voltages appearing at plates 27 and 29 are 180° out of phase since they are directly connected through lines 34 and 36 to the input terminals 32 and 33, respectively.

Referring now to the phase relationships of plates 28 and 30, it should be mentioned that in order to provide the proper quadrature relationship, resistors 37 and 41 must be made of a value equal to the reactances of capacitors 38 and 39. In this manner, the voltage at each plate is kept at equal values and the proper phase relationship is maintained. The resistance-capacitance networks provide a leading current of 45°, which in turn cause the voltage across plates 27, 29 to lead the voltage across plates 30, 28 by 90°. Accordingly, the phase of the voltage at plate 30 will be 90° behind that appearing at plate 29, and the phase of the voltage at plate 28 lags the phase of the voltage on plate 27 by the same value. Therefore, the voltage appearing on plate 28 will be at $\theta-90°$, while the phase of the voltage appearing on plate 30 will be at $-\theta-90°$.

In the above manner, there is provided on the surface of photocathode 11 a rotating polarization gradient in the counterclockwise direction as indicated by arrow 42. This rotating polarization gradient can be utilized to provide an indication of the value $r$ and $\theta$ in the polar coordinate system of an area of contrast upon the photocathode surface with regard to the center of the photocathode, as is set forth below.

Figure 5:
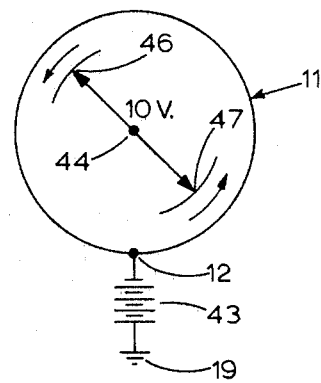
FIG. 5 is a diagram illustrating the rotary voltage gradient across a photocathode produced by the polarizing system of FIG. 4.

Referring now to FIG. 5 the surface of photocathode 11 is illustrated without the plates or metallic deposits shown thereon. For purposes of illustration, let it be assumed that the alternating voltage applied to the circuit, and thus across the surface of the photocathode 11, has a peak value of 10 volts. If a D.C. bias voltage is now applied directly to the photocathode 11 at its outer periphery terminal 12 equal to half the peak to peak alternating voltage which is applied to the plates, with respect to ground, the rotating electric field will produce a rotating voltage gradient across the photocathode surface. The value of this voltage gradient will be from 0 to 10 volts. A D.C. bias having a value of −5 volts can be provided by a battery 43, or the like. In FIG. 5, reference character 44 indicates the center point on the surface of photocathode 11. Reference numerals 46 and 47 indicate the end points of the rotating voltage gradient at a specific instant of time. The net potential at center point 44 will always be at −5 volts due to the bias applied by battery 43. At the instant of time illustrated in FIG. 5, end point 46 can be considered as having a net potential of −10 volts, while end point 47 can be considered as having a net potential of zero. The collector or anode of the phototube (not shown) is kept as zero potential for the invention to operate with the values indicated above.

An area of contrast in light energy falling on the photocathode at any point other than at the center will produce an A.C. component in the photoelectric output at the field rotation frequency and a smaller A.C. component at twice the rotation frequency. This second harmonic output is caused by the fact that with respect to the center of gradient rotation, the ends 46 and 47 of the gradient pass the area of contrast twice each cycle. This second harmonic component of the photoelectric output is usually of no basic value in determining the position of the source of light energy, and in some cases actually constitutes an unwanted background signal which may overload associated vacuum tubes, transistors, indicators, or the like, in the output circuit. Therefore, the photoelectric output circuit should be tuned to accept only the fundamental rotational frequency.

If an indication is desired in the rectangular coordinate system, the plate configuration of FIG. 4 can be used with two polarization frequencies applied push-pull to the diametrically opposite plates. Two phase detectors then can be utilized for providing signals indicative of the X and Y coordinates. Furthermore, for special purposes, any number of frequencies and plate pairs could be used based on the capacitive polarization principle of the invention.

Figure 6:
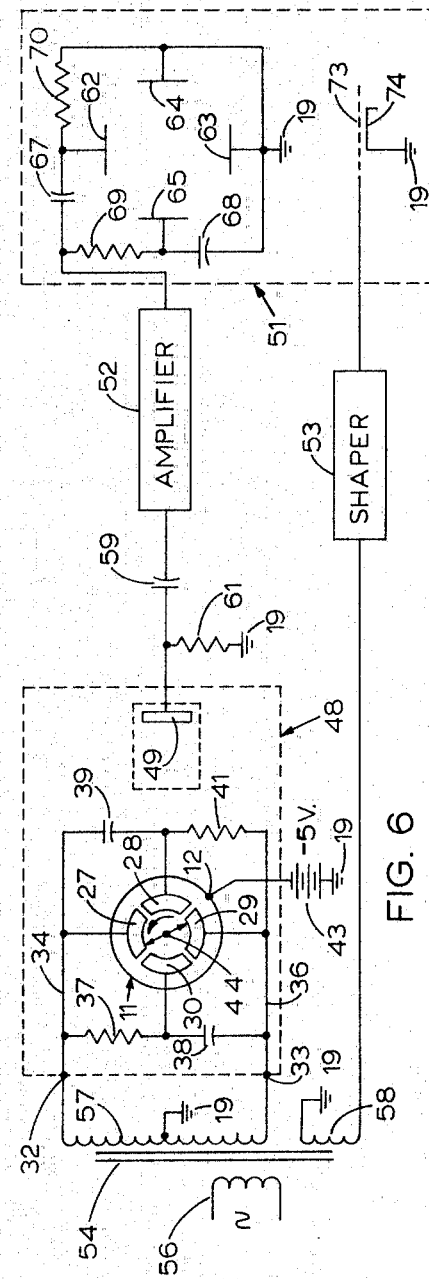
FIG. 6 is a diagram of one embodiment of the invention.

A schematic of a system adapted to provide an indication of the position of an area of contrast or the center of density of light energy falling on a photocathode is shown in FIG. 6. The system comprises a front surface phototube 48 having a photocathode 11 and an anode, or collector, or multiplier 49, and a cathode ray tube 51. Connected between phototube 48 and cathode ray tube 51 is an amplifier 52. Also included in the system is a wave shaper 53 and circuit energization means comprising a transformer 54.

The system is energized by a source of voltage (not shown) connected to primary 56 of transformer 54. A first secondary winding 57 provides an input to terminals 32 and 33 of the phototube 48. The secondary winding 57 is grounded at its midpoint at 19, thus providing voltage of opposite phase at the terminals 32 and 33. The common ground of the system is indicated by a single reference numeral 19. Photocathode 11 and its associated circuitry is identical to that described in FIG. 4, and the elements are identified with the same reference numerals.

In operation, photoelectric output is produced at the supply frequency when an area of contrast on the photocathode 11 is decentered. This A.C. output which is a result of the rotating voltage gradient as described with reference to FIG. 4, appears on the collector 49 and is of the same frequency as that appearing at the transformer 54. The magnitude of the output is dependent on the distance of the area of contrast from center point 44 of photocathode 11. The phase of the photoelectric output is dependent on the angular position of the area of contrast about the same center point 44.

The output appearing at collector 49 is then applied to the amplifier 52 through a coupling capacitor 59. A current leak resistor 61 is also provided to increase the operational characteristics of this portion of the circuit. Since the second harmonic component of the photoelectric output is not desired, amplifier 52 is tuned at the field rotation frequency appearing on the surface of photocathode 11 which is the same as the supply frequency. This A.C. signal is then amplified and fed to the deflection plates of cathode ray tube 51 through appropriate phase shift networks to produce a circular trace on the screen (not shown).

This portion of the cathode ray tube 51 consists of a pair of vertical deflection plates 62 and 63, and a pair of horizontal deflection plates 64 and 65. The A.C. output signal of amplifier 52 is provided in quadrature on the horizontal and vertical deflection plates 62–65 with the signal on the horizontal plates leading the signal on the vertical plates by 90°. In this manner, there is described upon the face of the cathode ray tube screen a circular trace which travels in the counterclockwise direction around the tube face. The diameter of this circular trace will be proportional to the distance of the area of contrast from the center 44 on the photocathode 11.

To achieve the proper quadrature relationship for the voltage appearing on vertical deflection plates 62–63 and the horizontal deflection plates 64–65, a resistance-capacitance network is provided. This network comprises a pair of capacitors 67 and 68, and a pair of resistors 69 and 70. In order to provide the proper phase relationship, resistance 69 is made equal to the reactance of capacitor 68, and the reactance 67 is made equal to the resistance of resistor 70. This arrangement results in the voltage on the plate 62 leading the voltage from junction 72 to ground 19 by 45°, and the voltage on the plate 65 lagging the voltage from junction 72 to ground by 45°. Thus the voltage between plates 62 and 63 will lead the voltage between plates 65 and 64 by 90°.

As a result a circular trace will be described on the screen of cathode ray tube 51 in a counterclockwise direction due to the application of the same signal on the horizontal deflection plates 64 and 65, and on the vertical deflection plates 62 and 63, with the latter signal lagging by 90°. The diameter of the circular trace is, of course, dependent upon the magnitude of the signal applied to the deflection plates.

To indicate the angular position of the area of contrast on the surface of photocathode 11, a phase reference signal is obtained from the A.C. polarizing supply through a secondary winding 58 and is used to intensity modulate the electron beam of the cathode ray tube 51. More specifically, the A.C. voltage from the secondary 58 is applied to a wave shaper 53, which may be of the common type providing a pulse output. This output is then supplied to the grid 73 of cathode ray tube 51, which in turn controls the beam of electrons originating from cathode 74. The grid 73 is biased to normally cut off the electron beam and thus will blank the screen of the cathode ray tube. When the wave shaper 53 applies an output pulse to the grid 73, the grid 73 allows the electron beam to pass to provide the desired display on the screen of cathode ray tube 51. The display thus will be produced on the screen of the cathode ray tube at the time the shaper 53 produces an output pulse. The angular position in which the display is produced will depend upon the phase of the output signal of the amplifier 52, the phase of the pulse output of the shaper 53 being constant. Accordingly the angular position of the display will correspond to the angular position of the area of contrast on the photocathode 11. The radial position of the display will depend upon the magnitude of the output signal of the amplifier 52 and therefore will depend upon the radial position of the area of contrast. Thus the two-dimensional position of the display produced on the screen of the cathode ray tube will correspond to the two-dimensional position of the area contrast on the photocathode 11. A very short output pulse from the shaper 53 will unblank the electron beam for a short period, thus providing a point display, or a longer pulse applied to grid 73 would result in the electron beam being unblanked for a longer period of time and the display would take the form of a crescent. Whichever display is desired, and the above are merely examples of several which result from a pulse output from wave shaper 53, the position of the area of contrast on the surface of photocathode 11 is indicated by the position of the display on the screen of cathode ray tube 51.

Thus, when an area of contrast appears on the surface of photocathode 11, the rotating voltage gradient produces an output at the collector 49, the phase of which is dependent upon the position of the area of contrast on the face, and the magnitude of which is dependent upon the distance from the center point 44 on the photocathode surface. This voltage signal output is then amplified and fed to the deflection plates of cathode ray tube 51 through appropriate phase shift networks to describe a circular trace on the screen. The diameter of this trace is proportional to the magnitude of the output, which provides an indication of the distance of the area of contrast from the center point 44 of the surface of the photocathode 11. To be meaningful, however, the cathode ray tube 51 also provide an indication of the angular position of the area of contrast. This is accomplished by unblanking the electron beam of the cathode ray tube 51 by means of a phase reference signal originating at the A.C. polarizing supply of the photocathode 11. In this means a bright point or crescent, or the like, will appear at the circular trace periphery, the angular position of which will be indicative of the exact angular position of the area of contrast on the surface of photocathode 11. Thus the cathode ray tube screen will provide a display, the two-dimensional position of which is dependent upon the two-dimensional position of the area of contrast on the photocathode 11. The screen of cathode ray tube 51 can have etched on its outer surface concentric circles and radial lines which will provide for a quick identification of the position of the area of contrast.

If it is desired to increase the linear amplification of the system, it is necessary only to increase the gain of the amplifier 52. A factor of several thousand can be obtained without any attempt to realize maximum sensitivity. This is to say that a displacement of .001" of the area of contrast from the null or center positon of a photocathode will give a corresponding deflection of more than 5" on the indicator face of a cathode ray tube.

Figure 7:
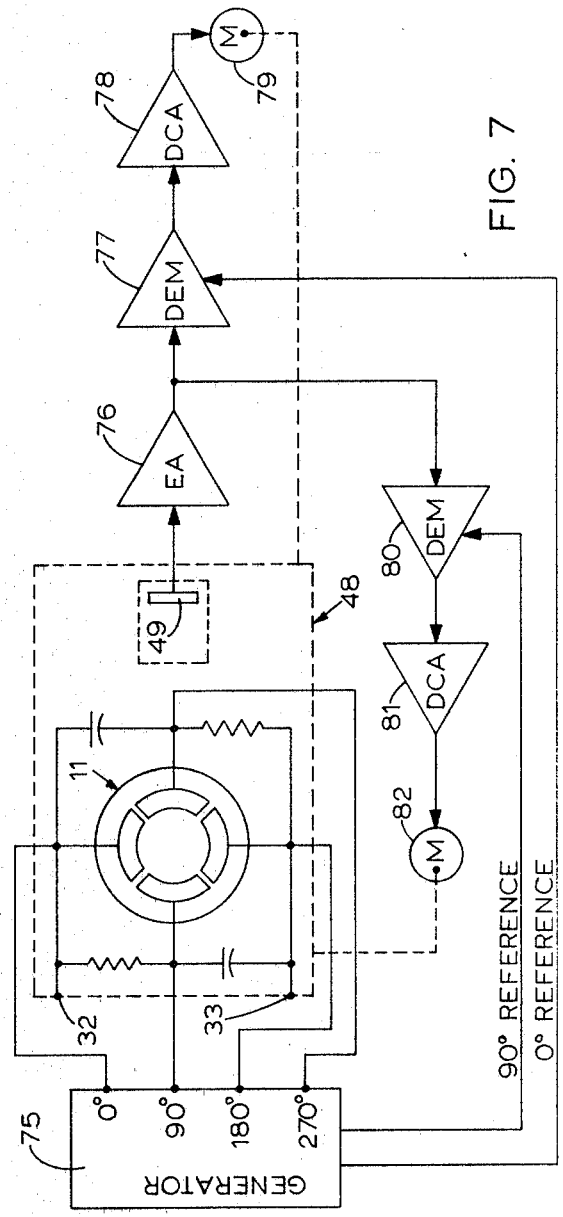
FIG. 7 is a diagram of another embodiment of the invention.

In FIG. 7, the invention is shown embodied in a closed-loop servo system which operates to adjust the position of phototube 48 or, more exactly, a movable structure on which it is mounted, so as to maintain the area of contrast of the precise geometric center 44 of photocathode 11. To this end, a signal generator 75 is provided which supplies reference phases (designated 0°, 90°, 180°, 270°) separated by 90°. Each reference voltage is applied directly to a respective one of the segments 27, 28, 29, 30.

In the customary manner well-known in the servo art, two error voltages, X and Y, are derived by comparison of the output of the phototube with the reference phases. The error signal is fed to an error amplifier 76, thence to a pair of demodulators 77 and 80. The 0° reference phase of generator 75 is applied to demodulator 77 and the resultant output D.C. error signal, e.g., the X error component is amplified by D.C. amplifier 78 and then utilized to control a motor 79 which displaces phototube 48 along the X axis, the direction depending on the polarity of the error signal.

In like manner, the 90° reference phase of generator 75 is fed to demodulator 80 and the resultant output D.C. error signal component Y is amplified by D.C. amplifier 81 and then utilized to control a motor 82 which displaces phototube 48 along the Y axis, the direction depending on the polarity of the error signal.

The above description is of preferred embodiments of the invention, and many modifications may be made thereto without departing from the spirit and scope of the invention, which is defined in the appended claims.

What is claimed is:

1. A position indicating device comprising photoemissive means adapted to receive the image of an object, voltage supply means capacitively coupled to said photoemissive means to induce a rotating voltage gradient upon said photoemissive means, collector means further associated with said photoemissive means to provide a voltage output caused by said rotating voltage gradient and the position of said object image on the photoemissive means, and indicating means adapted to receive said voltage output and provide an indication of the position of said object image.

2. A position indicator comprising a phototube having a photocathode and anode, circuit means capacitively coupled to said photocathode to provide a rotating voltage gradient on the surface of said photocathode, further circuit means connected to said anode to provide an output dependent upon the position of an area of contrast on the operable surface of said photocathode, said output being caused by the rotating voltage gradient passing through the area of contrast, and display means connected to said further circuit means arranged to provide an indication of the position of said area of contrast on said photocathode surface.

3. In combination, a phototube having an anode and a photocathode, a metallic plate placed adjacent the operating surface of said photocathode forming a capacitance with said surface, and a time variable voltage source connected across said metallic plate and photocathode surface producing a voltage gradient across said photocathode surface.

4. In combination, a phototube having a photocathode and an anode, a plurality of metallic plates insulated from each other placed adjacent the operating surface of said photocathode forming a like number of capacitances with said surface, and alternating voltage supply means providing alternating voltages of fixed frequency but different phase on said plates thereby producing a rotating voltage gradient across said photocathode surface.

5. A position indicating device comprising a phototube having a photoemissive cathode and collector, a plurality of metallic deposits adjacent the surface of said photocathode and arranged near the periphery thereof, said deposits forming a plurality of capacitances with the surface of said photocathode, a voltage source connected to said deposits producing a rotating voltage gradient upon said photocathode surface, said rotating voltage gradient causing an alternating voltage output upon repetitive passes through an area of contrast on said photocathode surface, amplifying means connected to said collector amplifying said alternating voltage output and a cathode ray tube connected to said amplifying means for providing a visual display of the position of said area of contrast on said photocathode surface.

6. A position indicating device comprising a phototube having a photocathode and an anode, a plurality of metallic plates arranged on the surface of the photocathode near the periphery thereof forming a like number of capacitances with said photocathode surface, a voltage source connected to said plates producing a rotating voltage around said photocathode surface, said rotating voltage gradient combining with an area of contrast on said photocathode surface to produce an alternating voltage output, circuit means connected to said anode for amplifying said alternating voltage output, and indicating means connected to said circuit means adapted to provide an indication of the position of the area of contrast on said photocathode surface.

7. A position indicating device as defined in claim 6 wherein said indicating means comprises a cathode ray tube having a pair of horizontal deflection plates and a pair of vertical deflection plates, said pairs of plates being connected to said circuit means for describing a circular trace on a screen of said cathode ray tube.

8. A position indicating device as defined in claim 7 further comprising means for producing a time reference signal connected to said cathode ray tube.

9. A position indicating device as defined in claim 8 wherein said time reference signal means is connected to a grid of said cathode ray tube to unblank an electron beam thereby producing a brightening of a portion of said described circular trace on said cathode ray tube screen.

10. In combination, a phototube having a photoemissive cathode and collector, a plurality of metallic areas adjacent the surface of said photocathode and arranged near the periphery thereof, said areas forming a plurality of capacitances with the surface of said photocathode, a voltage source connected to said deposits producing a rotating voltage gradient upon said photocathode surface, said rotating voltage gradient causing an alternating voltage output upon repetitive passes through an area of contrast on said photocathode surface, a source of reference voltage in a pre-determined phase relationship each applied to a respective one of said areas, means for comparing said output and reference voltages to generate an error signal, and means to displace said phototube in response to said error signal to minimize said signal.

References Cited by the Examiner
UNITED STATES PATENTS

| | | | |
|---|---|---|---|
| 2,241,809 | 5/1941 | De Forest | 315—24 X |
| 2,272,842 | 2/1942 | Hickok | 315—24 X |
| 2,646,533 | 6/1953 | Carne | 313—99 X |

RALPH G. NILSON, *Primary Examiner.*

J. D. WALL, *Assistant Examiner.*